United States Patent
Son et al.

(10) Patent No.: US 8,306,725 B2
(45) Date of Patent: Nov. 6, 2012

(54) APPARATUS FOR INFORMING ECONOMICAL SPEED OF VEHICLE AND METHOD THEREOF

(75) Inventors: Myunghee Son, Daejeon (KR); Haesook Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 520 days.

(21) Appl. No.: 12/629,224

(22) Filed: Dec. 2, 2009

(65) Prior Publication Data

US 2010/0145600 A1  Jun. 10, 2010

(30) Foreign Application Priority Data

Dec. 5, 2008 (KR) .................. 10-2008-0123474
Aug. 20, 2009 (KR) .................. 10-2009-0077213

(51) Int. Cl.
*G06F 19/00* (2011.01)
(52) U.S. Cl. ........ 701/123; 701/117; 123/468; 123/399; 123/486; 123/396; 123/361; 477/32; 477/43; 340/989; 340/933; 340/911

(58) Field of Classification Search .................. 701/123, 701/117; 123/468, 399, 486, 396, 361; 477/32, 477/43; 340/989, 933, 911
See application file for complete search history.

(56) References Cited

U.S. PATENT DOCUMENTS

2005/0065711 A1* 3/2005 Dahlgren et al. ............. 701/117

FOREIGN PATENT DOCUMENTS

| JP | 2004-205389 | 7/2004 |
| JP | 2007-170864 | 7/2007 |
| KR | 10-2000-0025188 | 5/2000 |

* cited by examiner

*Primary Examiner* — Thomas Black
*Assistant Examiner* — Luke Huynh
(74) *Attorney, Agent, or Firm* — Staas & Halsey LLP (57) ABSTRACT

Provided is directed to reduce unnecessary fuel consumption due to unnecessary rapid acceleration when a vehicle drives between intersections, and it is an object to allow for economical driving by reducing the fuel cost, and minimize environmental pollution by minimizing the exhaust gas of vehicle, by providing an economical speed for drivers such that vehicles that have passed through an intersection in accordance with the present traffic light economically drives to the next intersection.

14 Claims, 5 Drawing Sheets

APPARATUS FOR INFORMING ECONOMICAL SPEED OF VEHICLE AND METHOD THEREOF

RELATED APPLICATIONS

The present application claims priority to Korean Patent Application Serial Number 10-2008-0123474, filed on Dec. 5, 2008 and Korean Patent Application Serial Number 10-2009-0077213, filed on Aug. 20, 2009, the entirety of which are hereby incorporated by reference.

BACKGROUND OF THE INVENTION

1. Field of the Invention

The present invention relates to an apparatus for informing an economical speed of a vehicle and a method thereof, and more particularly, to an apparatus for informing an economical speed that informs a driver of the economical speed for economical driving at an intersection with a plurality of traffic signal devices in the city, and a method thereof.

2. Description of the Related Art

The gases causing the greenhouse effect of the various gases in the atmosphere are called greenhouse gases.

As the greenhouse gases, there are carbon dioxide, methane, nitrous oxide, Freon gas, and ozone. Although vapor is the most responsible for causing the natural greenhouse effect, a representative greenhouse gas causing global warming is carbon dioxide.

Since the latter half of $20^{th}$ century, global warming has rapidly progressed, unusual weather such that localized heavy rain, drought, typhoon etc. has been rapidly increased. If the present level of contamination continues, it is expected that the greenhouse gas emissions throughout the world will reach a level that seriously threatens mankind and the ecosystem in the sooner future.

In particular, due to the rapid increase of vehicles over the years, numerous questions about adverse effects on the environmental pollution and global warming due to the exhaust gas (particularly, carbon dioxide) from vehicles have been brought up. Accordingly, various efforts are being made at present in the transportation industry to reduce the greenhouse gas. As one of the efforts, a lot of efforts are made to improve fuel efficiency.

As one of the efforts, in order to improve fuel efficiency and reduce the exhaust gas from vehicles, vehicles have been equipped with an idle stop control device (or called an automatic engine start/restart device or an engine idle stop & go) which automatically stops the idle engine when the vehicles stop in driving in a city, such as waiting for a light, and then restarts the engine to restart the vehicles in a predetermined time.

By preventing unnecessary idling during a stop using the idle stop control device described above, in addition to reducing the fuel cost, environmental pollution and global warming are minimized by reducing the exhaust gas of vehicles.

When driving a vehicle downtown of a city and passing intersections at several times to get to the destination, most drivers don't know at how much speed they have to drive to start the vehicles stopped at the red light of a traffic signal device. Accordingly, there is a tendency to rapidly accelerate the vehicle by strongly pressing down the acceleration pedal.

However, a method of reducing unnecessary fuel consumption due to rapid acceleration etc. when driving between intersections has not been proposed yet. For example, drivers who drive a vehicle between intersections in a driving course to the destination cannot guess the economical speed because they don't know the information on the light of the next traffic signal device, such that they frequently make unnecessary rapid acceleration. Accordingly, in addition to increase of the exhaust gas of vehicles, there is a problem of deteriorating the fuel efficiency of the vehicles.

SUMMARY OF THE INVENTION

The present invention is directed to reduce unnecessary fuel consumption due to unnecessary rapid acceleration when a vehicle drives between intersections, and it is an object of the present invention to allow for economical driving by reducing the fuel cost, and minimize environmental pollution by minimizing the exhaust gas of vehicle, by providing an economical speed for drivers such that vehicles that have passed through an intersection in accordance with the present traffic light economically drivies to the next intersection.

An apparatus for informing an economical speed of a vehicle according to the present invention includes: a passing time measuring unit that measures an intersection-passing time of a vehicle; a passing velocity measuring unit that measures the velocity Vp of the vehicle passing an intersection; a distance calculating unit that calculates the distance to the next intersection in the course of the vehicle to a destination; a signal device condition information acquiring unit that acquires condition information of a traffic signal device at the next intersection at the intersection-passing time; a vehicle condition information acquiring unit that acquires information on the amount of fuel consumption to the power of the vehicle; a calculating unit that calculates driving velocity Vt for reduction of fuel consumption, using the distance to the next intersection, condition information of the traffic signal device, information on the amount of fuel consumption to the power of the vehicle, and the velocity Vp of the vehicle passing the intersection; and an output unit that outputs the driving velocity for reduction of fuel consumption for a driver.

In particular, the calculating unit calculates velocity Va at which the vehicle can pass the next intersection without waiting for a light, using the condition information of the traffic signal device and the distance to the next intersection, and then calculates driving velocity Vt for reduction of fuel consumption.

Further, the condition information of the next traffic signal device includes lighting period information of the next traffic signal device.

Further, the signal device condition information acquiring unit acquires condition information of the next traffic signal device, using traffic light information transmitted from a traffic information management server.

Further, a determining unit that determines whether the vehicle can pass the next intersection without waiting for a light while driving at the calculated driving velocity for reduction of fuel consumption is further included.

Further, when the vehicle cannot pass the next intersection without waiting for the light, the determining unit determines whether to operate an idle stop control function for the vehicle, and when the idle stop control function is not operated in the vehicle, the determining unit calculates and compares the amount (a) of fuel that the vehicle consumes for acceleration in order to pass the next intersection without waiting for the light and the amount (b) of fuel that the vehicle consumes for waiting for the light at the next intersection after driving at the calculated driving velocity for reduction of fuel consumption.

Further, the determining unit makes the velocity Va at which the vehicle can pass the next intersection without waiting for the light, outputted from the output unit to the driver, when the amount (a) of fuel that the vehicle consumes to accelerate is smaller than the amount (b) of fuel that the vehicle consumes to wait for a light.

On the other hand, a method of informing an economical speed of a vehicle, comprising: measuring the time when a vehicle passes an intersection and the velocity Vp of the passing vehicle; calculating the distance to the next intersection in the driving course to the destination of the vehicle; acquiring the condition information of a traffic signal device at the next intersection at the intersection-passing time, by receiving traffic light information transmitted from the traffic information management server or the traffic signal device at the next intersection; calculating velocity at which the vehicle can pass the next intersection without waiting for a light, using the condition information of the traffic signal device and the distance to the next intersection; and calculating driving velocity Vt for reduction of fuel consumption by receiving information on the amount of fuel consumption to the power of the vehicle and using the information on the amount of fuel consumption to the output, passing velocity Vp of the vehicle, and the passing-possible velocity Va, and then outputting the driving velocity for reduction of fuel consumption to a driver.

In particular, the condition information of the traffic signal device includes lighting period information of the next traffic device.

The method further includes: determining that the vehicle can pass the next intersection without waiting for a light while driving at the calculated driving velocity for reduction of fuel consumption; and determining whether an idle stop control function is operated in the vehicle, when the vehicle cannot pass the next intersection without waiting for a light.

The method further includes: calculating the amount of fuel (a) consumed by the vehicle for acceleration to pass the next intersection without waiting for the light, when the idle stop control function is not operated in the vehicle; calculating the amount (b) of fuel that the vehicle consumes to wait for a light at the next intersection after driving at the calculated driving velocity Vt for reduction of fuel consumption; and comparing the amount (a) of fuel that the vehicle consumes to accelerate with the amount (b) of fuel that the vehicle consumes to wait for a light.

The method further includes: outputting the driving velocity Vt for reduction of fuel consumption for a driver, when the idle stop control function is operated in the vehicle.

The method further includes: outputting the velocity Va at which the vehicle can pass the next intersection without waiting for a light for a driver, when the amount (a) of fuel that the vehicle consumes to accelerate is smaller than the amount (b) of fuel that the vehicle consumes to wait for a light.

The method further includes: outputting the driving velocity Vt for reduction of fuel consumption for a driver, when the amount (a) of fuel that the vehicle consumes to accelerate is larger than the amount (b) of fuel that the vehicle consumes to wait for a light.

The present invention has the following effects.

According to the above description, it has the advantage of minimizing environmental pollution and global warming by preventing unnecessary rapid acceleration to reduce the exhaust gas of vehicles, and reducing the fuel cost by improving the fuel efficiency of the vehicles, by providing an optimal driving velocity profile for reducing fuel consumption to drivers, under a condition that unnecessary rapid acceleration frequently occurs in driving between intersections.

DETAILED DESCRIPTION OF THE PREFERRED EMBODIMENTS

The present invention will be described below with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the figures may be exaggerated for explicit comprehension.

Hereinafter, an apparatus for informing an economical speed of a vehicle and a method thereof according to an embodiment of the present invention will be described with reference to the accompanying drawings.

Figure 1:
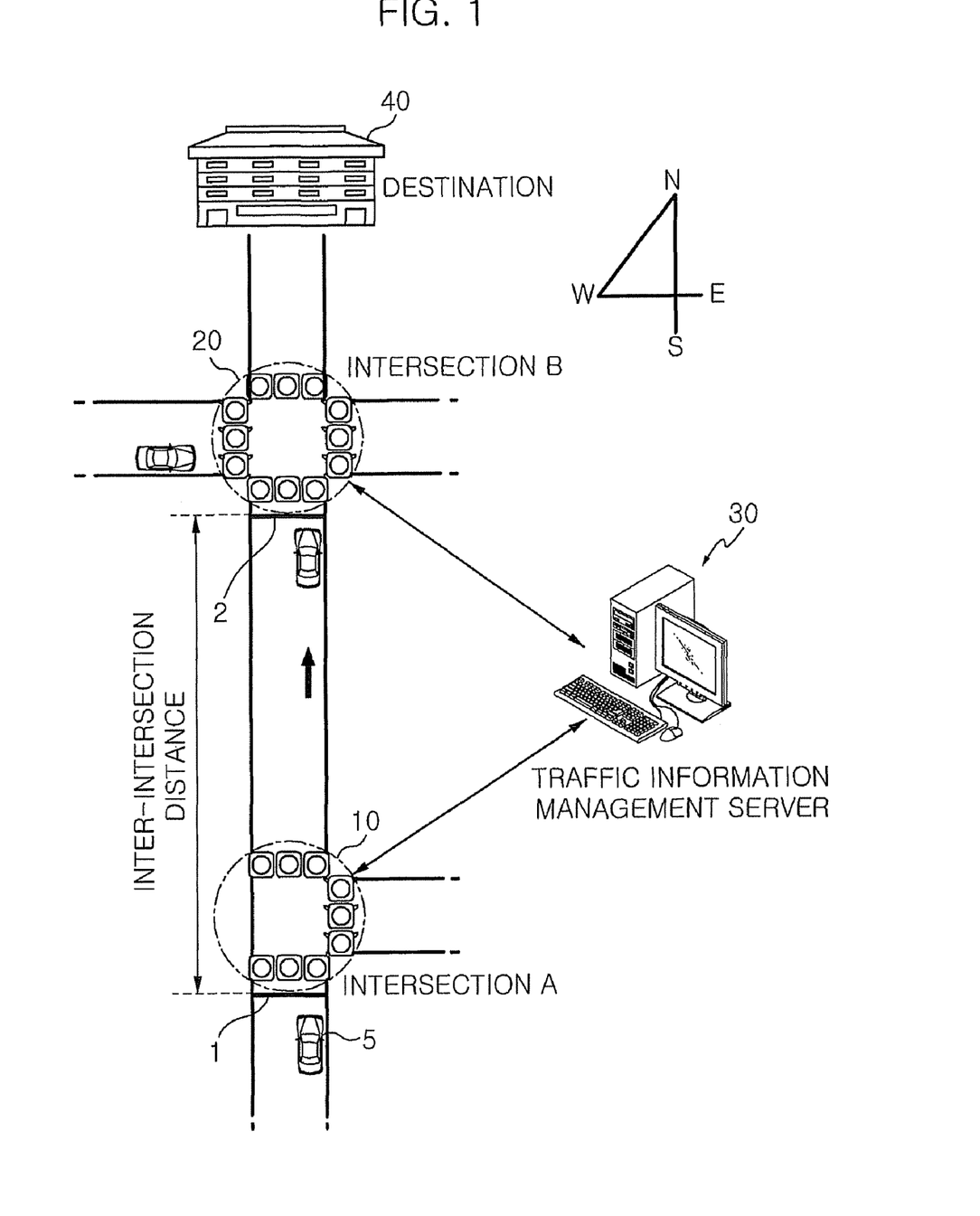
FIG. 1 is a conceptual view of a service for helping understand the present invention.

FIG. 1 is a conceptual view of a service for helping understand the present invention.

Numerous intersections, such as intersection A and intersection B, exist in the downtown and traffic signal devices 10, 20 are disposed for smooth traffic flow.

It is assumed in the present invention that a road with traffic lights for controlling the flow of driving vehicles is referred to as an intersection. These intersections are provided with traffic signal devices (or traffic lights), as described above, and there are provided with traffic light controllers for controlling the traffic signal devices. The traffic light controller (not shown) communicates traffic light information with a traffic information management server 30 at a long distance, using a wire/wireless communication method, or communicates traffic light information with other adjacent traffic light controllers. Further, the traffic light controller provides traffic light information required for the apparatus for informing the economical speed of a vehicle according to the present invention.

Meanwhile, the traffic information management server 30 manages traffic light information of one or more intersections and provides information to devices requiring traffic light information in a wire/wireless communication way.

The traffic information management server 30 manages the traffic light information (including the phase information) operated in intersection A and the traffic light information (including the phase information) operated in intersection B, and has information on the distance between the intersections (distance between the traffic lights). Accordingly, the traffic information management server 30 calculates and provides the optimal economical speed to drivers, or may provide related traffic light information to a vehicle such that they calculate the optimal economical speed.

For example, when a vehicle driving toward the destination 40 drives to intersection B through intersection A to arrive the destination 40, it is possible to calculate the distance between the stop line 1 of the intersection A and the stop line 2 of the intersection B.

Figure 2:
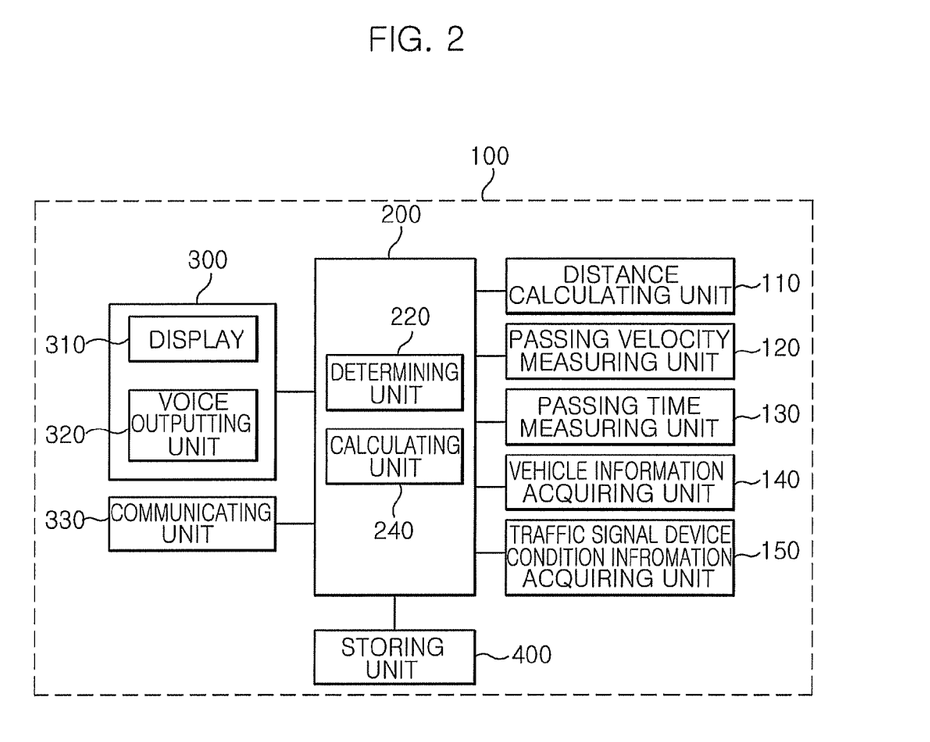
FIG. 2 is a view illustrating an apparatus for informing an economical speed of a vehicle according to an embodiment of the present invention.

FIG. 2 is a block diagram illustrating in detail an apparatus for informing an economical speed of a vehicle according to an embodiment of the present invention.

An apparatus 100 for informing an economical speed of a vehicle according to the present invention includes: a distance calculating unit 110 that calculates the distance to the next intersection in the course of the vehicle to a destination; a passing velocity measuring unit 120 that measures the velocity Vp of the vehicle passing an intersection; a passing time measuring unit 130 that measures the intersection-passing time of the vehicle; a vehicle condition information acquiring unit 140 that acquires information on the amount of fuel consumption to the power of the vehicle; a traffic signal device condition information acquiring unit 150 that acquires the condition information of a traffic signal device at the next intersection at the intersection-passing time; a control unit 200 that calculates driving velocity for reduction of fuel consumption, using the distance to the next intersection, condition information of the next traffic signal device, the information on the amount of fuel consumption to the power of the vehicle, and the velocity Vp of the vehicle passing the intersection; an output unit 300 that outputs the calculated driving velocity Vt for reduction of fuel consumption for a driver; a communicating unit 330 that communicates traffic light information with the traffic information management server or adjacent traffic light controllers; and a storing unit 400 that stores programs and involved data for achieving the present invention.

The technical configuration of the apparatus for informing an economical speed of a vehicle is described hereafter in more detail with reference to FIGS. 1 and 2. The description is made under an assumption that a vehicle passes stop line 1 of intersection A, and then continues driving to the north and passes stop line 2 of intersection B.

The passing time measuring unit 130 measures the time when the vehicle passes an intersection (hereafter, intersection A) of the road. The intersection-passing time of the vehicle can be based on the stop line 1, as shown in FIG. 1. However, this is not limited thereto, the reference to determine the intersection-passing time of the vehicle depends on the environment around the road. Further, as described above, the intersection in the present invention implies a road where traffic lights exist to control the flow of vehicles driving.

The passing velocity measuring unit 120 measures the passing velocity of the vehicle passing intersection A. Although a variety of methods known in the art can be used for the methods of measuring the intersection-passing time and the intersection-passing velocity of the passing time measuring unit 130 and the passing velocity measuring unit 120, these are not the main technical characteristics and the description is substituted by an example described below.

For example, assume that the apparatus 100 of the present invention is disposed in a vehicle, the passing time measuring unit 130 and the passing velocity measuring unit 120 are provided with an RFID tag, and two RFID readers (first RFID reader and second RFID reader) are disposed at a predetermined distance (d) from each other on an intersection. When the vehicle passes the intersection, the first RFID reader detects the RFID reader of the passing time measuring unit 130 and then transmits a detection signal to the passing time measuring unit 130, and correspondingly, the passing time measuring unit 130 can measure the intersection-passing time of the vehicle on the basis of the inputted detection signal. Meanwhile, the passing velocity measuring unit 120 measures the passing times t1, t2 when the vehicle passes the locations of the first RFID reader and the second RFID reader on the basis of detection signals transmitted from the first RFID reader and the second RFID reader when the vehicle passes the intersection, and then can calculate the velocity of the vehicle [Vp=d/(t2−t1)] which passes the intersection, using the measured times t1, t2 and the distance (d) between the locations of the readers.

Further, the passing velocity measuring unit 120 can measure the intersection-passing velocity by receiving information on the driving velocity of the vehicle from the ECU (Electronic Control Unit) of the vehicle at the intersection-passing timing.

In FIG. 2, although the passing time measuring unit 130 and the passing velocity measuring unit 120 are illustrated as independent units to help understanding the present invention, they may be combined for practical implementation.

The distance calculating unit 110 calculates a distance D of a position (e.g. the stop line of the intersection B) where the vehicle driving on the course toward the destination will be controlled by the next traffic signal device 20 (second traffic signal device). For example, the distance may be the distance between intersection A and intersection B. The traffic information management server 30 has information on the inter-intersection distance, such that the distance calculating unit 110 can acquire the distance D, using the traffic light information transmitted from the traffic information management server 30. Further, the distance calculating unit 110 may receive location information, which is transmitted from a GPS satellite (not shown), through a location information communicating unit 330 and calculate the distance D, using the information. That is, it is possible to calculate the distance D, using the present location information of the vehicle and the location information of the next traffic signal device in the driving course.

The vehicle information acquiring unit 140 acquires information on the amount of fuel consumption to the power of the vehicle (or information of the fuel saving condition of the vehicle), using output information of the vehicle, such as the RPM (Revolution Per Minute) and the amount of fuel injection of the vehicle, which is received from the ECU of the vehicle or a user. Further, the vehicle information acquiring unit 140 acquires the condition information on whether an idle stop control device operates, from the ECU of the vehicle.

The traffic signal device condition information acquiring unit 150 acquires condition information of the traffic signal device 20 at the next intersection (intersection B), when the vehicle passes the present intersection (intersection A).

In detail, the traffic signal device condition information acquiring unit 150 acquires the condition information of the second traffic signal device 20, when the vehicle passes the stop line. The condition information includes lighting period information of the second traffic signal device 20 (e.g. yellow light-turning on time $T_Y$/red light-turning on time $T_R$/green light-turning on time $T_G$ of FIG. 3) and the phase information. For example, the lighting period information of the second traffic signal device may be $T_Y(5\ s)$-$T_R(40\ s)$-$T_G(60\ s)$ and the phase information may be information when 15 seconds passed after the green light was turned on.

Further, the traffic signal device condition information acquiring unit 150 may acquire the condition information of the second traffic signal device 20, using traffic light information transmitted from the traffic information management server 30, or directly acquire it, using the traffic light information transmitted from the second traffic signal device 20.

The output unit 300 outputs velocity information calculated by the control unit to the driver, by control of the control unit 200. In detail, the output unit 300 includes a display 310 for outputting visual information and a voice output unit 310 for outputting aural information to the driver, such that it receives velocity information from the controller 200 and transmits visual and aural information to the driver, using them.

The communicating unit 330 receives traffic light information required for implementing the present invention from external devices (e.g. adjacent signal controller or traffic information management server), or transmits a requiring signal to the external devices to acquire necessary traffic light information.

The storing unit 400 stores programs and involved data required for implementing the present invention.

The control unit 200 controls each unit described above to achieve the present invention, and calculates and provides velocity for economical driving of the vehicle to the output unit 300, using the information transmitted from each unit.

For this operation, the control unit 200 includes a determining unit 220 and a calculating unit 240.

The calculating unit 240 calculates driving velocity for reduction of fuel consumption, using the inter-intersection distance D, the condition information of the traffic signal device B, the information on the amount of fuel consumption to the power of the vehicle, and the intersection-passing velocity Vp of the vehicle. In detail, the calculating unit 240 calculates a profile of velocity Va at which the vehicle can pass the intersection B without waiting for the lights, using the condition information of the traffic signal device B (including lighting period information and phase information) and the inter-intersection distance D. Further, the calculating unit 240 calculates a profile of the driving velocity for reduction of fuel consumption (velocity without rapid acceleration and rapid deceleration of a vehicle), using the profile of the velocity Va calculated as described above, the information on the fuel consumption to the power of the vehicle, and the intersection-passing velocity Vp of the vehicle.

Figure 3:
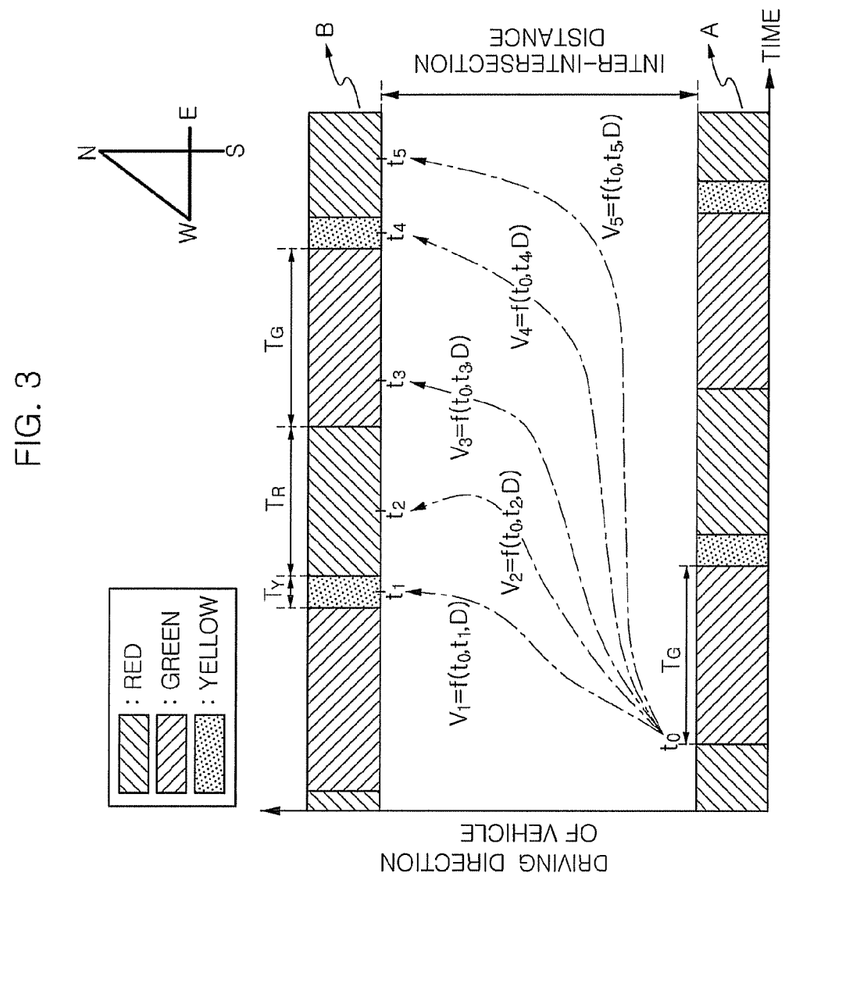
FIG. 3 is a view illustrating the relationship of a traffic signal period in respects to the driving direction of a vehicle driving in the downtown.

Describing with reference to FIG. 3, herein, the horizontal axis shows the lighting period of the traffic signal device as a function of time and the vertical axis shows the driving direction of a vehicle. Further, 'A' refers to the lighting period of the first traffic signal device of the present intersection (intersection A) and 'B' refers to the lighting period of the second traffic signal device of the next intersection (intersection B).

A vehicle can pass intersection A, when the green light of the first traffic signal device is turned on, in which the intersection passing time of the vehicle is $t_0$, and the times where the vehicle is under control of the second traffic signal device after passing intersection A are $t_1$, $t_2$, $t_3$, $t_4$, and $t_5$.

Then, $t_0$ is $0 < t_0 < T_G$, $t_1$ is $0 < t_1 < T_Y$, $t_2$ is $0 < t_2 < T_R$, $t_3$ is $0 < t_3 < T_G$, $t_4$ is $0 < t_4 < T_Y$, and $t_5$ is $0 < t_5 < T_R$. Where, the times $t_1$, $t_2$, $t_3$, $t_4$, $t_5$ are times passing after time $t_0$, such that calculation is performed under an assumption that $t_0$ is 0.

Therefore, the profiles of the velocities when the vehicle reaches the intersection B after passing intersection A can be expressed like, $V_1 = f(t_0, t_1, D)$, $V_2 = f(t_0, t_2, D)$, $V_3 = f(t_0, t_3, D)$, $V_3 = f(t_0, t_4, D)$, and $V_5 = f(t_0, t_5, D)$. The traffic light of the second traffic signal device is repeated in one cycle of the yellow light-turning on time $T_Y$/red light-turning on time $T_R$/green light-turning on time $T_G$. The lighting period of the traffic light can be different for each area and nation operating the traffic light, and the present invention can be applied to those light patterns.

A vehicle driving should reach when the green light of the second traffic signal device is turned on to pass the intersection B without waiting for the light. For example, assume that the time when a driving vehicle passes the intersection A is 3 p.m., 15 seconds has passed after the green light of the second traffic signal device at intersection B at 3 p.m., the lighting period of the second traffic signal device is $T_Y = 5$ s/$T_R = 40$ s, /$T_G = 60$ s, and the inter-intersection distance is 3 km.

The driving vehicle should reach intersection B within 45 s (=60 s−15 s) or between 90 s and 150 s to pass intersection B without waiting for the light after passing intersection A. Assuming that the vehicle reaches the intersection B between 90 s and 150 s, it can pass the intersection when driving at 72 km/h to 120 km/h. That is, the vehicle should drive at least at 72 km/h to pass intersection B without waiting for the light. However, the velocity calculated as described above may be the economical speed (economical driving velocity for waving fuel consumption) or not, depending on the output or the conditions of the vehicle. For example, the 72 km/h speed may be the economical speed for vehicles that continue driving after passing intersection A without waiting for the light or large vehicles with a large displacement; however, the speed 72 km/h may not be the economical speed for small vehicles with a small displacement or vehicles that stop and start at intersection A. That is, small vehicles with a small displacement or vehicles that stop and start at intersection A may have a problem of consuming more fuel to accelerate to 72 km/h.

Accordingly, the calculating unit 240 finally calculates the driving velocity for reduction of fuel consumption Vt, by re-calculating with the amount of fuel consumption to the power of the vehicle and the intersection-passing velocity Vp of the vehicle, on the basis of the calculated velocity Va. For example, it is determined that a vehicle starts after stopping, when the intersection-passing velocity Vp is a critical value or less. Those skilled in the art can acquire the driving velocity for reduction of fuel consumption Vt in various ways, using the information, and the process of calculating the driving velocity for reduction of fuel consumption Vt is not limited to any one.

The determining unit 220 determines whether the vehicle can pass the next intersection without waiting for the light, when driving at the driving velocity for reduction of fuel consumption Vt calculated by the calculating unit 240.

Further, when the vehicle cannot pass the next intersection without waiting for the light, the determining unit 220 determines whether to operate the idle stop control function in the vehicle, and when the idle stop control function is not operated in the vehicle, it calculates the amount of fuel (a) that the vehicle consumes for acceleration in order to pass the next intersection without waiting for the light and the amount of fuel (b) that the vehicle consumes for waiting for the light (idle) at the next intersection after driving at the calculated driving velocity for reduction of fuel consumption, and compares them. The idle stop control function is a function that automatically stops the idle engine when a vehicle stops driving in a city to wait for a light, and restarts the engine to start the vehicle in a predetermined time.

The determining unit 220 makes the profile of the velocity Va at which the vehicle can pass the next intersection without waiting for the light, outputted visually or vocally from the output unit 300 to the driver, when the amount of fuel (a) that the vehicle consumes to accelerate is smaller than the amount of fuel (b) that the vehicle consumes to wait for a light. The determining unit 220 makes the profile of the velocity Vt for reduction of fuel consumption, outputted visually or vocally from the output unit 300 to the driver, when the amount of fuel (a) that the vehicle consumes to accelerate is larger than the amount of fuel (b) that the vehicle consumes to wait for a light.

On the other hand, the apparatus for informing an economical speed of a vehicle can calculate and provide traffic information for driving (driving velocity information) in advance before the driver passes the present intersection. However, it can be combined with a navigation system that displays the present location of a vehicle, using a GPS provided therein, and guides the driving course to the destination.

Figure 4:
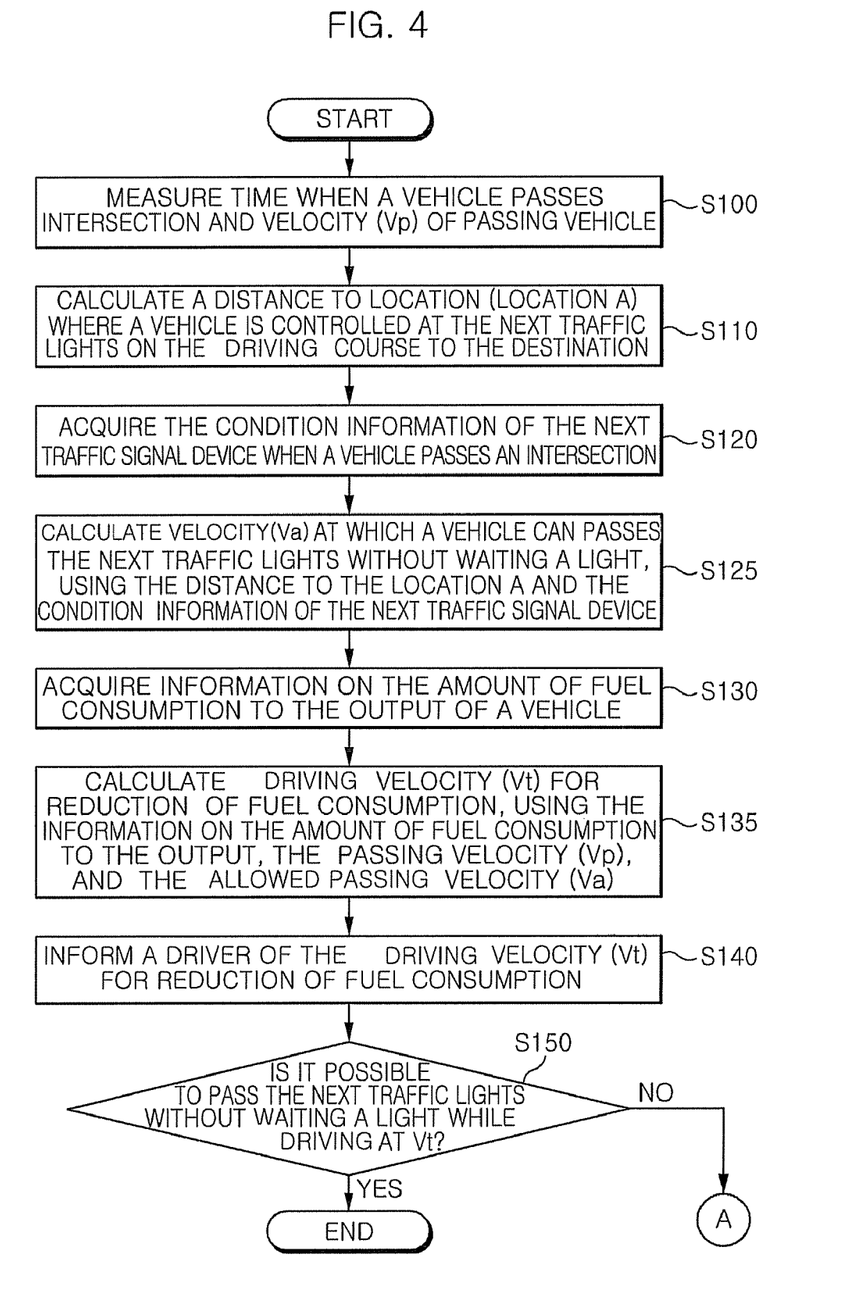
FIGS. 4 and 5 are flowcharts for illustrating a method of informing an economical speed of a vehicle according to an embodiment of the present invention.
Figure 5:
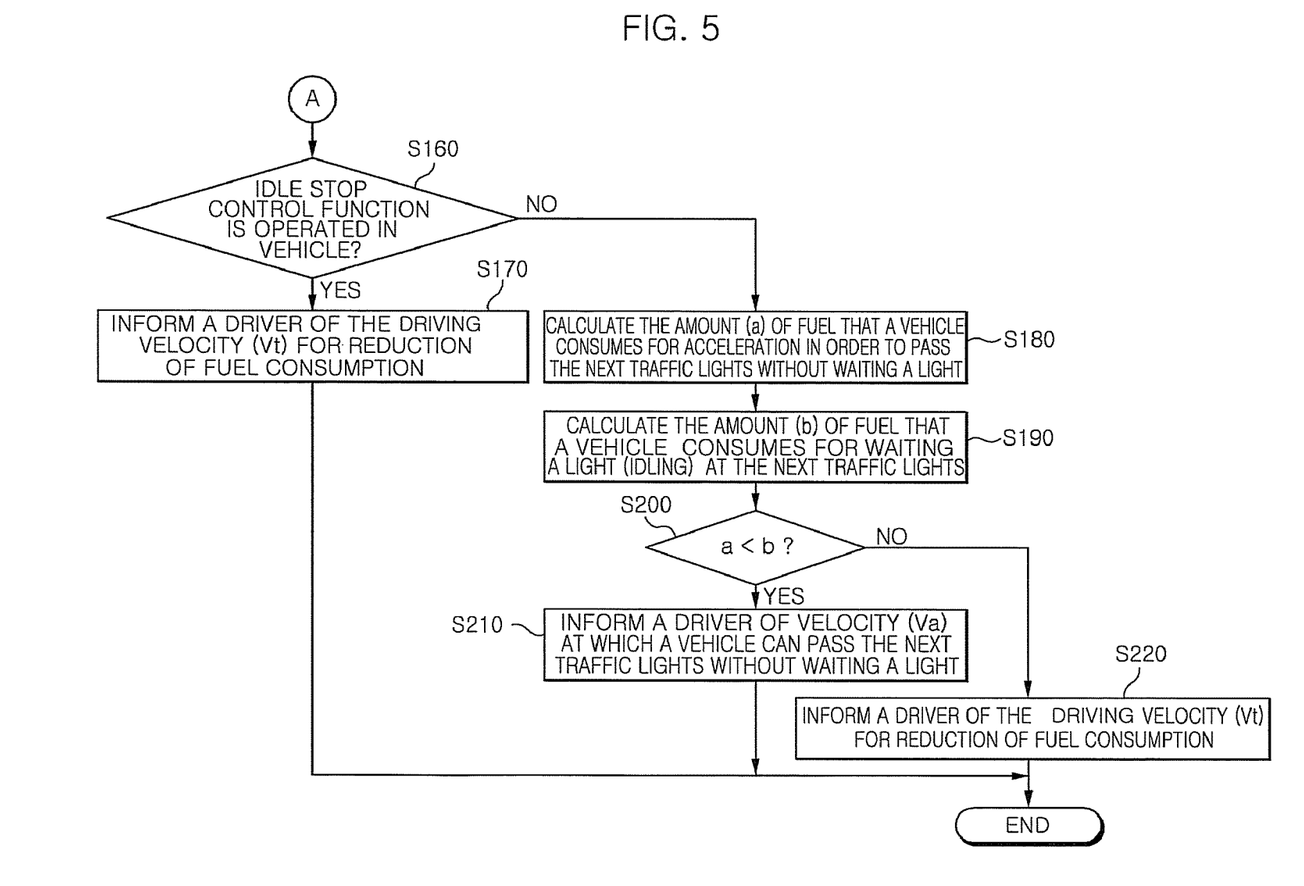

FIGS. 4 and 5 are flowcharts for illustrating a method of informing an economical speed of a vehicle according to an embodiment of the present invention.

Hereafter, describing with reference to FIGS. 4 and 5, the time when a vehicle passes the present intersection and the velocity Vp of the passing vehicle are measured (S100). Next, the distance to the next intersection in the driving course to the destination when the vehicle passes the intersection is measured (S110) and the condition information of the traffic signal device at the next intersection when the vehicle passes the present intersection is measured (S120). In this process, the present intersection-passing timing can be determined at the stop line of the road and the condition information of the next traffic signal device includes the lighting period information and the phase information. In S120, the condition information of the next traffic signal device can be acquired by using traffic light information transmitted from the traffic information management server or by using the traffic light information transmitted from an adjacent traffic signal device.

Subsequently, the profile of the velocity Va at which the vehicle can pass the next intersection without waiting for a light is calculated from the condition information of the next traffic signal device and the distance to the next intersection (S125). However, the velocity calculated as described above may not be an economical speed, depending on the output or conditions of the vehicle. Accordingly, in the present invention, the profile of the driving velocity for reduction of fuel consumption Vt that allows for avoiding rapid acceleration and rapid deceleration is calculated, by re-calculating with the amount of fuel consumption to the power of the vehicle and the intersection-passing velocity Vp of the vehicle, on the basis of the profile of the calculated velocity Va (S135). In the process, the information on the amount of fuel consumption to the output is acquired by using the vehicle output information, such as RPM of the vehicle and the amount of fuel injection, which is received from the ECU of the vehicle of a user (S130).

Next, the profile of the driving velocity for reduction of fuel consumption Vt calculated in S135 is outputted to the driver, using visual or vocal methods (S140). However, various references, such as economic conditions, driving safety, and drivers' propensities, can be additionally considered to calculate the driving velocity for reduction of fuel consumption Vt in S135.

After outputting the profile of the driving velocity for reduction of fuel consumption Vt to the driver, it is determined whether it is possible to pass the next intersection without waiting for the light, while driving at the driving velocity for reduction of fuel consumption Vt (S150).

As a result from the determination in S150, when it is possible to pass the next intersection without waiting for the light, the process is finished, or the process continues to the next step and it is determined that the idle stop control function is operated in the vehicle (S160). When an idle stop control device is equipped in the vehicle and the function is operated, fuel is not consumed by the idle stop control function even if the vehicle waits for the light at the next intersection. Therefore, it is possible to utilize the idle stop control function without unnecessarily consuming the fuel by excessively accelerating.

As a result of determination in S160, when the idle stop control function is operated in the vehicle, it is performed to remind the driver that the idle stop control function is operated and to output again the driving velocity Vt calculated in S135 to guide the driver not to excessively accelerate and economically drive the vehicle (S170).

On the other hand, when the idle stop control function is not operated in the vehicle, passing the next intersection without waiting for the light while accelerating may be more advantageous than consuming the fuel while waiting for the light (idling), in terms of fuel saving.

Accordingly, as a result from the determination in S160, when the idle stop control function is not operated in the vehicle, the amount of fuel (a) consumed by the vehicle for acceleration to pass the next intersection without waiting for the light is calculated (S180). Further, the amount of fuel (b) consumed when the vehicle drives at the driving velocity for reduction of fuel consumption Vt and waits for the light at the next intersection is calculated (S180). Subsequently, the calculated amounts of fuel consumption (a) and (b) are compared (S200).

As a result of comparison in S200, when the amount of fuel consumption (a) is smaller than the amount of fuel consumption (b), an available acceleration profile within a limit in which the amount of fuel consumption (a) does not exceeds the amount of fuel consumption (b) is calculated and outputted to the driver in a visual or a vocal method (S210).

On the other hand, as a result from the comparison in S200, when the amount of fuel consumption (a) is larger than the amount of fuel consumption (b), the driving velocity Vt calculated in S135 is outputted again to guide the driver to economically drive the vehicle (S220). That is, when the amount of fuel consumed while waiting for the light at the next intersection (idling) is small, since it is economically advantageous that the vehicle stops at the next traffic lights, the driver is guided to drive the vehicle at the driving velocity for reduction of fuel consumption Vt without excessively accelerating.

According to the above description, it has the advantage of minimizing environmental pollution and global warming by preventing unnecessary rapid acceleration to reduce the exhaust gas of vehicles, and reducing the fuel cost by improving the fuel efficiency of the vehicles, by providing an optimal driving velocity profile for reducing fuel consumption for drivers, under a condition that rapid acceleration frequently occurs in driving in a city due to the traffic light at intersections.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for informing an economical speed of a vehicle, comprising:
 a passing time measuring unit that measures an intersection-passing time of a vehicle;
 a passing velocity measuring unit that measures the passing velocity of the vehicle passing an intersection;
 a distance calculating unit that calculates the distance to the next intersection in the course of the vehicle to a destination;

a traffic signal device condition information acquiring unit that acquires condition information of a traffic signal device at the next intersection at the intersection-passing time;

a vehicle condition information acquiring unit that acquires an information on the amount of fuel consumption to the power of the vehicle;

a calculating unit that calculates a driving velocity for reduction of fuel consumption, using the distance to the next intersection, condition information of the traffic signal device, information on the amount of fuel consumption to the power of the vehicle, and the passing velocity; and an output unit that outputs the driving velocity.

2. The apparatus for informing an economical speed of a vehicle according to claim 1, wherein the calculating unit calculates an allowed passing velocity at which the vehicle can pass the next intersection without waiting for a light, using the condition information of the traffic signal device and the distance to the next intersection, and then calculates the driving velocity.

3. The apparatus for informing an economical speed of a vehicle according to claim 1, wherein the condition information of the next traffic signal device includes a lighting period information of the next traffic signal device.

4. The apparatus for informing an economical speed of a vehicle according to claim 1, wherein the signal device condition information acquiring unit acquires the condition information of the next traffic signal device, using a traffic signal information transmitted from a traffic information management server.

5. The apparatus for informing an economical speed of a vehicle according to claim 1, further comprising:
a determining unit that determines whether the vehicle can pass the next intersection without waiting for the light while driving at the driving velocity.

6. The apparatus for informing an economical speed of a vehicle according to claim 5, wherein when the vehicle cannot pass the next intersection without waiting for the light, the determining unit determines whether to operate an idle stop control function for the vehicle, and when the idle stop control function is not operated in the vehicle, the determining unit calculates and compares the amount of fuel that the vehicle consumes for acceleration in order to pass the next intersection without waiting for the light and the amount of fuel that the vehicle consumes for waiting for the light at the next intersection after driving at the driving velocity.

7. The apparatus for informing an economical speed of a vehicle according to claim 6, wherein the determining unit makes the allowed passing velocity to be outputted from the output unit, when the amount of fuel that the vehicle consumes to accelerate is smaller than the amount of fuel that the vehicle consumes to wait for the light.

8. A method of informing an economical speed of a vehicle, comprising:
measuring a time when a vehicle passes an intersection and a passing velocity of the vehicle;
calculating a distance to a next intersection in the driving course to a destination of the vehicle;
acquiring a condition information of a traffic signal device at the next intersection at the intersection-passing time, by receiving a traffic signal information transmitted from a traffic information management server or the traffic signal device at the next intersection;
calculating an allowed passing velocity at which the vehicle can pass the next intersection without waiting for a light, using the condition information of the traffic signal device and the distance to the next intersection; and
calculating a driving velocity for reduction of fuel consumption by receiving information on the amount of fuel consumption to the power of the vehicle and using the information on the amount of fuel consumption to the output, the passing velocity, and the allowed passing velocity, and then outputting the driving velocity.

9. The method of informing an economical speed of a vehicle according to claim 8, wherein the condition information of the traffic signal device includes the lighting period information of the next traffic signal device.

10. The method of informing an economical speed of a vehicle according to claim 8, further comprising:
determining that the vehicle can pass the next intersection without waiting for the light while driving at the driving velocity; and
determining whether an idle stop control function is operated in the vehicle, when the vehicle cannot pass the next intersection without waiting for the light.

11. The method of informing an economical speed of a vehicle according to claim 10, when the idle stop control function is not operated in the vehicle, further comprising:
calculating an amount of fuel that the vehicle consumes to accelerate to pass the next intersection without waiting for the light;
calculating an amount of fuel that the vehicle consumes to wait for the light at the next intersection after driving at the driving velocity; and
comparing the amount of fuel that the vehicle consumes to accelerate with the amount of fuel that the vehicle consumes to wait for the light.

12. The method of informing an economical speed of a vehicle according to claim 10, further comprising:
outputting the driving velocity when the idle stop control function is operated in the vehicle.

13. The method of informing an economical speed of a vehicle according to claim 11, further comprising:
outputting the allowed passing velocity when the amount of fuel that the vehicle consumes to accelerate is smaller than the amount of fuel that the vehicle consumes to wait for the light.

14. The method of informing an economical speed of a vehicle according to claim 11, further comprising:
outputting the driving velocity when the amount of fuel that the vehicle consumes to accelerate is larger than the amount of fuel that the vehicle consumes to wait for the light.

* * * * *